March 24, 1970　　　　M. C. GROSS　　　　3,502,283
FILM CARTRIDGE, CASE AND SPOOL
Filed Oct. 2, 1967
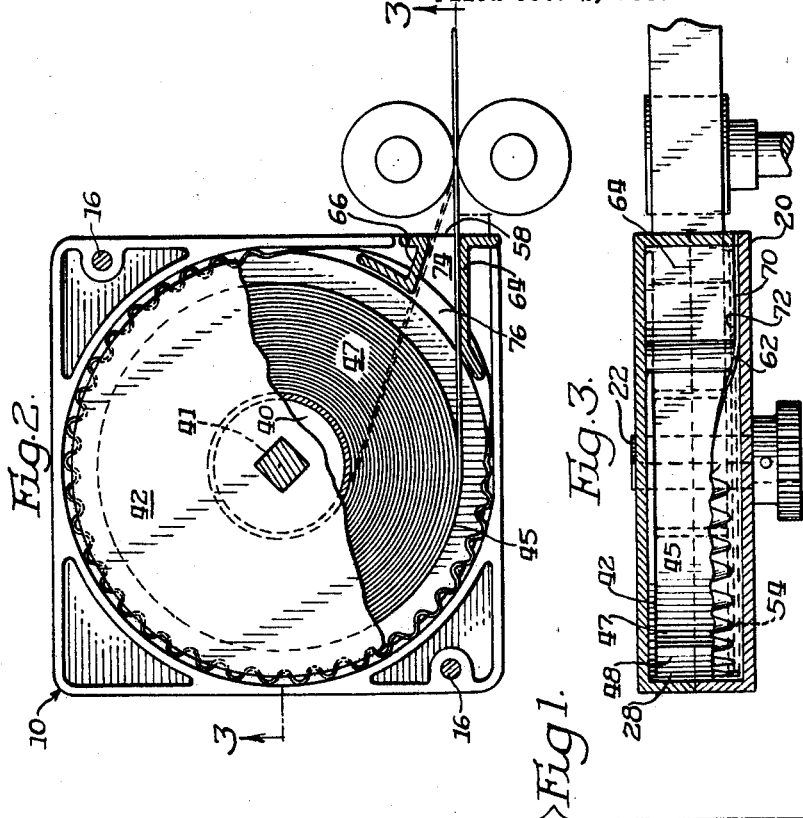
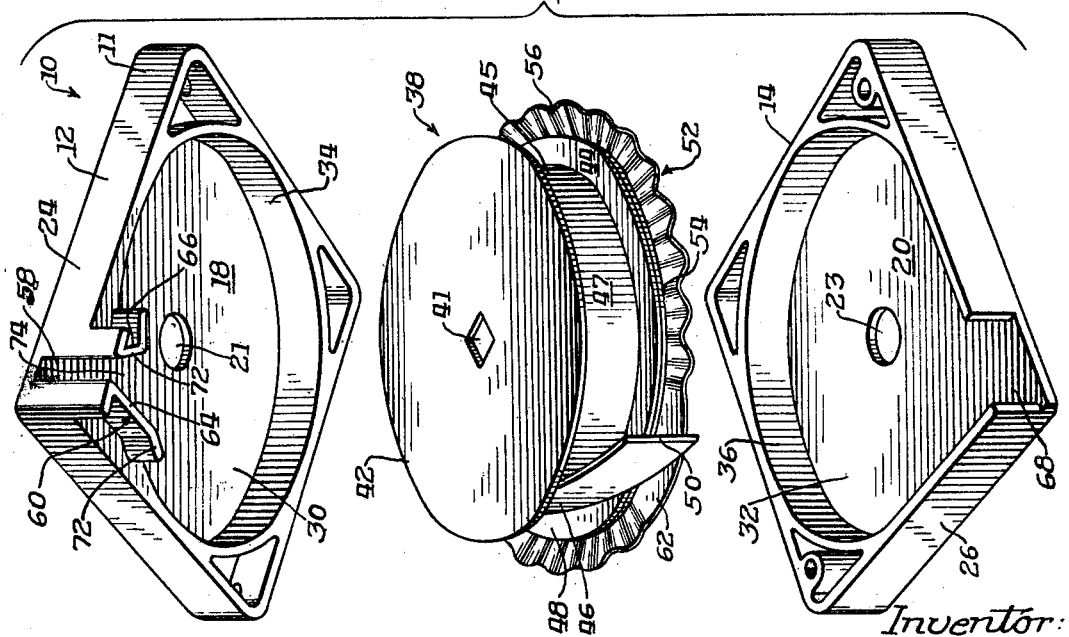
Inventor:
Maynard C. Gross
By　Jack H Hall　Atty

United States Patent Office 3,502,283
Patented Mar. 24, 1970

3,502,283
FILM CARTRIDGE, CASE AND SPOOL
Maynard C. Gross, Chicago, Ill., assignor to Bell & Howell Company, Chicago, Ill., a corporation of Illinois
Filed Oct. 2, 1967, Ser. No. 672,181
Int. Cl. G11b 23/04
U.S. Cl. 242—197   14 Claims

ABSTRACT OF THE DISCLOSURE

A retainer rotatable with a film spool for preventing retention of the lead end of a film strip coiled about the spool by curved parts of a spool case during spool rotation. A deflector diverts said retainer adjacent an outlet opening in said case to liberate the film strip for exiting from said cartridge.

---

This invention relates to a cartridge for webs having thereon recorded reproducible information and to spools and cases comprising such cartridge.

Within a case comprising a cartridge of the indicated class, a web such as a film strip for a picture projector is wound under tension on a spool. The resulting coil, if unrestrained, may spill from the spool to release its tension and accordingly force the outer convolution of the coil into engagement with a curved inner wall of the case. Subsequent endeavor to drive the lead end of the film strip from the case by thereto relatively rotating the spool through torque applied to the spool may jam the cartridge because the driving torque transmitted to the lead end through the spilled coil is likely to be inadequate for overcoming the frictional and mechanical blocking forces resulting from such engagement.

Conventionally this undesirable phenomenon has been prevented by conditioning the lead end of a film strip coil for resisting the untensioning force. One prior contrivance is a long and relataively stiff leader attached to the lead end of a film coil for weighting or bending it from engagement with its case and conducting it through a cartridge exit slot. It is not entirely satisfactory, however, because it does not prevent spilling inwardly of the coil from its lead end and associated problems of torque transmission to the leader. Another prior expedient is an appliance outside of the cartridge which is connected to the lead end of a film coil and proportioned to prevent withdrawal into the case under coil untensioning torque. The appliance conventionally has taken the form of a mere lug or a take-up reel permanently associated with the cartridge.

It is an object of the present invention to facilitate removal of the lead end of a film strip coil from a film cartridge case.

It is another object of the invention to preclude the requirement for securing the lead end of a coiled cartridge contained film strip to an appliance to prevent unwinding of the coil and jamming of the cartridge.

It is a further object of the invention to provide an improved film cartridge comprised of a therein coiled web having thereon recorded reproducible information.

It is yet another object of the invention to provide an improved film spool for supporting a coiled web in a case comprising a cartridge of the indicated class.

It is an additional object of the invention to provide an improved case comprising said cartridge.

To effect the foregoing objects, a cartridge for storage and feeding a film strip has a reversibly rotatable spool for supporting the film strip in a coil. The cartridge includes a case with a slot for reversibly passing the film strip to and from the spool. Retainer means is associated with the spool for releasing the outermost turn of the coil into an aisle in said case adjacent said slot for film passage from said cartridge and for preventing engagement of said coil and case at all other positions. Moreover, the retainer may be of resilient fabrication and mounted for rotation with the spool for selectively releasing the film strip from a chamber defined by opposed radial flanges of the spool.

The foregoing and other objects, features, and advantages of the present invention will become more apparent upon consideration of the following description and appended claims when considered in conjunction with the accompanying drawings wherein the same reference character or numeral refers to like or corresponding parts throughout the several views.

On the drawings:

FIG. 1 is an exploded perspective view of a film cartridge embodying the present invention and comprising a pair of casing members shown at different angular aspects.

FIG. 2 is a sectional view of said cartridge, part of the case having been broken away.

FIG. 3 is a view according to section line 3—3 of FIG. 2. The section line follows an inner arcuate wall of the casing member.

Referring now more particularly to the drawings, a cartridge 10 is comprised of a case 11 having first and second casing members 12 and 14 which are releasably secured together by a pair of suitable fasteners such as screws 16. Each casing member 12 and 14 has a casing side wall 18 and 20 respectively, which are parallel, of equal expanse, and centrally apertured as at 21 and 23 respectively, for accommodation of a power driven axis member 22. A perimetric flange 24 extending normally from casing side wall 18 abuts a perimetric flange 26 extending normally from casing side wall 20 to space said casing side walls each from the other and define a spool chamber 28 within case 11.

In the illustrated embodiment, spool chamber 28 is formed from a pair of wells 30 and 32. A first circularly arcuate wall 34 fashioned on casing member 12 within flange 24 together with side wall 18 defines well 30. A second circularly arcuate wall 36 having the same radius of curvature as arcuate wall 34 and fashioned on casing member 14 within flange 26 together with side wall 20 defines well 32.

Cartridge 10 also is comprised of a spool 38 which is disposed in case 11 and has a hub 40 with a pair of parallel end flanges 42 and 44. The latter are arranged at opposite ends of said hub and square slotted as at 41 to snugly receive correspondingly fashioned axis member 22 for driving said spool.

A web such as a film strip 46 is wound under tension in a tight coil 47 about hub 40 in a film chamber 48 formed between spool flanges 42 and 44. The arrangement is such that an axis member 22 rotates spool 38, torque will be transmitted through coil 47 for driving a lead end 50 in the angular direction of torque application.

Coil 47 tends to release the tension under which it has been wound, and if this tendency is not curtailed film strip 46 will spill radially of spool 48 causing an outermost turn 45 of the coil to engage walls 34 and 36 thereby generating a frictional and blocking force sufficient to overcome feed torque transmitted to the spilled film. As a consequence, spool 38 will rotate relative to film 46 and case 12 to jam the cartridge.

To obviate that occurrence, resilient retainer means may comprise a disc 54 having the same diameter as, and fixed to, the outer surface of flange 44. A radial resilient retainer 56 in the form of an endless skirt or apron is secured to or integral with disc 54 from which said retainer projects outwardly. Retainer 56 is fabricated to conform to its adjoining casing member which is proportioned to turn the said retainer over flange 44 toward flange 42 between case 11 and coil 47 and partially cover film chamber 48. This arrangement prevents film strip 46 from spilling out of chamber 48 and undesirably engaging walls 34 and 36. Except where it is desired that the film strip 46 leave chamber 48, said film strip is retained between flanges 42 and 44 and, accordingly, upon rotation from an initial position in which lead end 50 is disposed within case 11, said lead end will be held for selective release in a manner which will become apparent from ensuing description.

Flexible and resilient characteristics are imparted to retainer 56 by causing it to assume an undulant profile having adjoining portions arranged peripherally of flange 44. This feature facilitates successive removal of said adjoining portions from chamber 48 for releasing successive portions of film strip 46 from said spool chamber adjacent a cartridge exit slot 58 as spool 38 rotates for feeding said film strip. A deflector 60 associated with case 11 diverts retainer 56 adjacent a slot 58 from covering position over film strip 46. To that end, a portion 62 (FIGS. 1 and 3) of said retainer is bent to engage about said deflector. Thereby, as spool 38 rotates, adjoining portions of said retainer will be successively removed from the path of film strip 46 and drawn about about deflector 60 adjacent slot 58. The fabrication and structure of the retainer is such that its deflected portions spontaneously dispose themselves between film strip 46 and case 11 after such portions have moved beyond deflector 60.

Deflector 60 comprises a pair of spaced apart members 64 and 66 which are fashioned integrally with casing member 12 and define a straight aisle or throat 74. It has an entrance 76 leading from cartridge chamber 28 at one end and exit slot 58 in flange 24 at the other end. Members 64 and 66 are arranged at opposite ends, respectively, of arcuate wall 34 and are dimensioned for projection normally of side wall 18 beyond flange 24. Flange 26 of casing member 14 has a cut-out or recess 68 which extends to side wall 20 and in which the outer portion of deflector 60 is disposed. As a result of the foregoing, aisle 74 is disposed in both wells 30 and 32, with its entrance 76 and slot 58 aligned in a straight path for reversibly passing film strip 46 at opposite ends of deflector 60. The extent of projection of members 64 and 66 beyond flange 24 is slightly less than the extent flange 26 projects from wall 20. Accordingly, a space 70 (FIG. 3) is defined by wall 20 and adjoining surfaces 72 of deflector 60 in which successively deflected portions 62 of retainer 56 are maintained out of the path of film strip passing through aisle 74 as spool 38 rotates.

In one aspect of the invention, casing member 14 may be considered a covered for well 30. Within the framework of this definition, deflector 60 is fashioned to divert retainer 56 between members 64 and 66 defining said deflector and such cover about slot 58.

By reason of the foregoing construction, lead end 50 of the film strip 46 may be withdrawn wholly within case 11 without concern about jamming when the spool is rotated in a feed direction. That is because the outer convolution of said film strip is blocked from engagement with the curved parts of case 11 and engage the case only in aisle 74 in which frictional resistance is insufficient to overcome the torque transmitted to the said lead end. As a consequence, conventional preconditioning of the lead end of a cartridge contained film strip is obviated.

The embodiments of the invention in which an exclusive property or privilege is claimed are defined as follows:

1. In a film spool for insertion in a cartridge case, the combination of a hub for rotationally supporting a thereabout coiled web, a pair of opposed radial flanges defining therebetween a chamber about said hub for the web, a resilient retainer mounted for rotation with said spool and means for diverting said retainer to selectively permit release of the web from said chamber.

2. A combination according to claim 1 in which said retainer extends over said hub for holding the outer convolution of the web in said chamber.

3. A combination according to claim 2 characterized in that said retainer has adjoining portions arranged radially about and coincident with the periphery of one of said flanges for successive removal from said chamber at a common station for releasing successive portions of said web from said chamber.

4. A combination according to claim 3 characterized in that said retainer has an undulant profile for facilitating removal of said adjoining portions from said chamber.

5. In a cartridge for storage and feeding of a web and having a reversibly rotatable spool for supporting said web in a coil and a case with a slot for reversibly passing the web to and from said spool, the improvement comprising retainer means associated with said spool for releasing the outermost turn of said coil adjacent said slot for passage from said cartridge and for preventing engagement of said coil and case at other positions, and a deflector associated with said case for diverting the retainer means adjacent said slot.

6. A combination according to claim 5 in which the retainer means comprises a resilient endless member tensioned between the outer turn of said coil and said case and having a portion engaged about said deflector for continuously removing said retainer means from the path of said coil adjacent said slot as said spool rotates.

7. A combination according to claim 5 in which said retainer means comprises an endless undulant member rotationally secured for rotation with said spool and fashioned for spontaneous disposition between said coil and said case after diversion.

8. A combination according to claim 5 in which the case has a spool chamber defined by an arcuate wall and in which said retainer is disposed between said web and said wall, said arcuate wall having opposite ends spaced apart on opposite sides of said slot, said deflector comprising a pair of members defining an aisle extending to said slot and disposed between said opposite ends.

9. A combination according to claim 8 in which said case comprises a cover for said spool chamber, said deflector fashioned to divert said retainer means out of said chamber between said members and said cover about said slot.

10. In a cartridge case for a web spool, the combination of: a first casing member having a slot for passing a web to and from said spool; a first arcute wall defining a first well for accommodation of said spool in said first casing member and having opposite spaced apart ends disposed on opposite sides of said slot; aisle means carried by said first casing member for passing a web between said first well and said slot, and a second casing member releasably secured to said first casing member for covering said first well, said second casing member having a perimetric flange with an opening in which said aisle means is disposed.

11. A combination according to claim 10 in which said second casing member has a second well which together with said first well defines a spool chamber.

12. A combination according to claim 11 in which said aisle means comprises a pair of spaced apart members having portions extending from said first casing into said second well.

13. A combination according to claim 12 in which said portions are integral with said first casing member and have outer ends which define said slot.

14. In a cartridge for storage and feeding of a web and having a reversibly rotatable spool for supporting said web in a coil and a case with a slot for reversibly passing the web to and from said spool, the improvement comprising retainer means associated and movable with said spool for releasing the outermost turn of said coil adjacent said slot for passage from said cartridge and for preventing engagement of said coil and case at other positions.

References Cited

UNITED STATES PATENTS

| | | | |
|---|---|---|---|
| 2,731,894 | 1/1956 | Leitz et al. | 242—71.1 |
| 3,220,659 | 11/1965 | Pastor et al. | |
| 3,323,746 | 6/1967 | Mouisie | 242—74.2 |
| 3,346,210 | 10/1967 | Carstensen et al. | 242—71.1 |
| 3,384,318 | 5/1968 | Nerwin et al. | 242—71.1 |

GEORGE F. MAUTZ, Primary Examiner

U.S. Cl. X.R.

206—53; 242—71.8